(12) United States Patent
Ge et al.

(10) Patent No.: US 10,061,256 B2
(45) Date of Patent: Aug. 28, 2018

(54) DRIVING SYSTEM AND IMAGE FORMING APPARATUS

(71) Applicant: Zhuhai Seine Technology CO., Ltd., Zhuhai (CN)

(72) Inventors: Yuechao Ge, Zhuhai (CN); Xining Ding, Zhuhai (CN); Juzheng Xia, Zhuhai (CN); Jie Xian, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/894,400

(22) Filed: Feb. 12, 2018

(65) Prior Publication Data

US 2018/0164732 A1 Jun. 14, 2018

Related U.S. Application Data

(63) Continuation of application No. PCT/CN2016/081018, filed on May 4, 2016.

(30) Foreign Application Priority Data

Aug. 25, 2015 (CN) .......................... 2015 1 0528710

(51) Int. Cl.
*G03G 15/00* (2006.01)
*B41J 3/60* (2006.01)
(Continued)

(52) U.S. Cl.
CPC ............ *G03G 15/6573* (2013.01); *B41J 3/60* (2013.01); *F16H 1/206* (2013.01);
(Continued)

(58) Field of Classification Search
CPC .......... G03G 15/6573; G03G 15/2064; G03G 15/231; G03G 15/6552; G03G 15/757; B41J 3/60; F16H 1/206
See application file for complete search history.

(56) References Cited

U.S. PATENT DOCUMENTS

2002/0101025 A1   8/2002  Lee et al.
2005/0284244 A1* 12/2005  Fuhrer .................... F16H 3/091
                                                74/355

(Continued)

FOREIGN PATENT DOCUMENTS

CN        102556743 A    7/2012
CN        202727618 U    2/2013

(Continued)

*Primary Examiner* — David Banh
(74) *Attorney, Agent, or Firm* — Anova Law Group, PLLC (57) ABSTRACT

A driving system comprises a driving gear, a first one-way transmission assembly, a second one-way transmission assembly. The driving gear configured to rotate forward or backward. The first one-way transmission assembly comprises a first gear and a second gear coaxially coupled with the first gear. The first gear is configured to join the second gear in a rotating process in a first direction to drive the second gear to rotate in the first direction. The first gear is disconnected with the second gear in a rotating process in a direction opposite to the first direction. The second one-way transmission assembly comprises a third gear and a fourth gear coaxially coupled with the third gear. The third gear is configured to join the fourth gear in a rotating process in a second direction to drive the second gear to rotate in the second direction.

20 Claims, 6 Drawing Sheets

(51) Int. Cl.
*F16H 1/20* (2006.01)
*G03G 15/20* (2006.01)
*G03G 15/23* (2006.01)

(52) U.S. Cl.
CPC ....... *G03G 15/2064* (2013.01); *G03G 15/231* (2013.01); *G03G 15/6552* (2013.01); *G03G 15/757* (2013.01)

(56) References Cited

U.S. PATENT DOCUMENTS

| | | | |
|---|---|---|---|
| 2007/0009284 A1* | 1/2007 | Okamoto | G03G 15/168 399/101 |
| 2007/0119280 A1 | 5/2007 | Takahashi | |
| 2010/0028046 A1 | 2/2010 | Abe et al. | |
| 2010/0096797 A1 | 4/2010 | Chen et al. | |
| 2011/0091237 A1* | 4/2011 | Suzuki | G03G 15/161 399/101 |
| 2011/0198181 A1 | 8/2011 | Tu et al. | |
| 2013/0102435 A1* | 4/2013 | Roussey | F16H 1/2863 475/344 |
| 2015/0090563 A1 | 4/2015 | Uesugi et al. | |
| 2015/0212456 A1* | 7/2015 | Imaizumi | G03G 21/1647 74/665 G |
| 2017/0038702 A1* | 2/2017 | Kodo | G02B 26/121 |

FOREIGN PATENT DOCUMENTS

| | | |
|---|---|---|
| CN | 105045062 A | 11/2015 |
| JP | H0640100 A | 2/1994 |
| JP | H08159223 A | 6/1996 |
| JP | 2004205688 A | 7/2004 |
| JP | 2007120758 A | 5/2007 |

\* cited by examiner

FIG. 7

DRIVING SYSTEM AND IMAGE FORMING APPARATUS

CROSS-REFERENCES TO RELATED APPLICATIONS

This application is a continuation application of PCT Patent Application No. PCT/CN2016/081018, filed on May 4, 2016, which claims the priority of Chinese Patent Application No. 201510528710.6, filed on Aug. 25, 2015, the content of all of which is incorporated by reference in their entirety.

TECHNICAL FIELD

The present disclosure generally relates to the field of image forming technology and, more particularly, to driving system and image forming apparatus.

BACKGROUND

An image forming device may be categorized into a striking type, an ink jet type, and an electronic imaging type. Accordingly, the image forming device may include a ribbon printer, an ink printer, and a laser printer.

Figure 1:
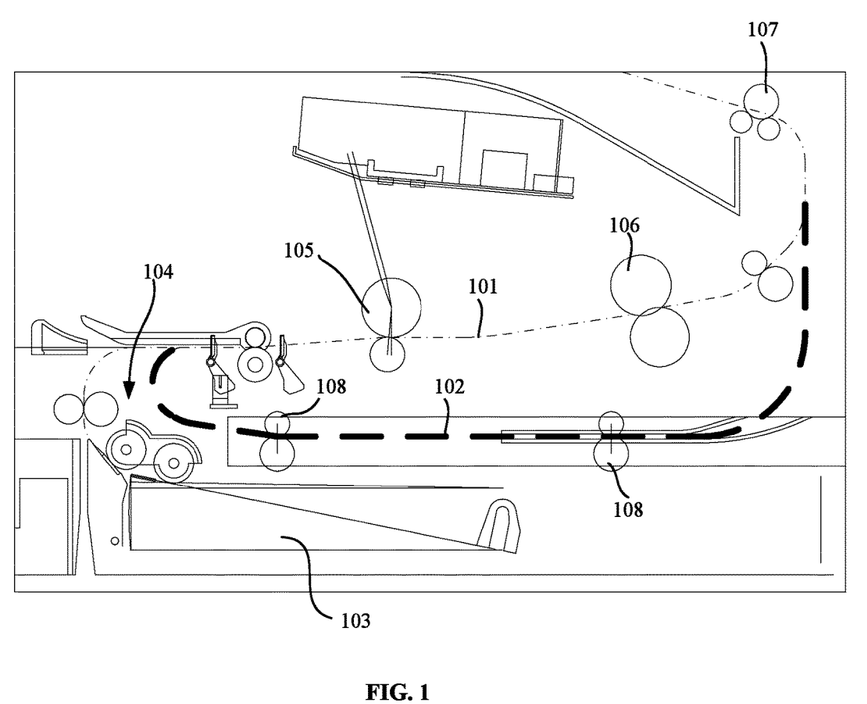
FIG. 1 is a schematic structural diagram of a conventional image forming device.

FIG. 1 illustrates an image forming device. The image forming device includes a first path 101 and a second path 102. A paper disc 103, a paper pick-up unit 104, a developing unit 105, a fixing unit 106, and a paper discharge unit 107 are sequentially arranged along the first path 101.

The paper inlet of the second path 102 is connected to somewhere between the fixing unit 106 and the paper discharge unit 107. The paper outlet of the second path 102 is connected to somewhere between the pickup unit 104 and the developing unit 105. A double-sided printing unit 108 is arranged between the paper inlet and the paper outlet of the second path 102. When the paper is printed on one side, the paper is conveyed from the paper tray 103 to the developing unit 105 by the paper pickup unit 104. The developing unit 105 transfers the developer to the front side of the paper to form an image. The paper is conveyed to the fixing unit 106, and the fixing unit 106 fixes the image on the front side of the paper. Then the paper is conveyed to the paper discharge unit 107, and the paper discharging unit 107 rotates forward to discharge the paper. When the paper needs to be printed on two sides, the paper discharging unit 107 rotates backward to convey the single-sided paper to the paper inlet of the second path 102. Then after the paper is turned over by the double-sided printing unit 108, the paper is discharged from the paper outlet of the second path 102 to the developing unit 105. The developing unit 105 transfers the developer to the back side of the paper to form another image. Then the paper is conveyed to the fixing unit 106, and the fixing unit 106 fixes the image on the back side of the paper. The paper is conveyed to the paper discharge unit 107, and the paper discharge unit 107 discharges the paper from the paper discharge unit 107.

During the above printing process, the driving part of the fixing unit 106 and the driving part of the double-sided printing unit 108 are always rotating forward. And the paper discharging unit 107 needs to rotate forward during the single-sided printing process, and rotate backward during the double-sided printing process. Thus, conventional image forming device has a driving system including a first motor and a second motor. The first motor is used for driving the driving part of the fixing unit 106 and the driving part of the double-sided printing unit 108 to always rotate in the clock wise direction. The second motor rotates forward or backward to drive the paper discharging unit 107 to rotate forward or backward, respectively. Therefore the cost of the image forming apparatus and the complexity of the control system are increased.

The disclosed system and apparatus are directed to at least partially alleviate one or more problems set forth above and to solve other problems in the art.

SUMMARY

One aspect of the present disclosure provides a driving system. The driving system comprises a driving gear, a first one-way transmission assembly, a second one-way transmission assembly. The driving gear configured to rotate forward or backward. The first one-way transmission assembly comprises a first gear and a second gear coaxially coupled with the first gear. The first gear is configured to join the second gear in a rotating process in a first direction to drive the second gear to rotate in the first direction. The first gear is disconnected with the second gear in a rotating process in a direction opposite to the first direction. The second one-way transmission assembly comprises a third gear and a fourth gear coaxially coupled with the third gear. The third gear is configured to join the fourth gear in a rotating process in a second direction to drive the second gear to rotate in the second direction. The third gear is disconnected with the fourth gear in a rotating process in a direction opposite to the second direction. The first gear and the third gear are engaged with the driving gear, and the second gear is engaged with the fourth gear. When the driving gear is rotating forward, the first gear is configured to receive a driving force of the driving gear to rotate in the first direction and drives the second gear to rotate in the first direction, the fourth gear is configured to receive a driving force of the second gear to rotate in the second direction and the third gear is configured to receive the driving force of the driving gear to rotate in the direction opposite to the second direction. When the driving gear is rotating backward, the third gear is configured to receive the driving force of the driving gear to rotate in the second direction and drives the fourth gear to rotate in the second direction, the second gear is configured to receive a driving force of the fourth gear to rotate in the first direction and the first gear is configured to receive the driving force of the driving gear to rotate in the direction opposite to the first direction.

Another aspect of the present disclosure provides an image forming apparatus including a driving system. The driving system comprises a driving gear, a first one-way transmission assembly, a second one-way transmission assembly. The driving gear configured to rotate forward or backward. The first one-way transmission assembly comprises a first gear and a second gear coaxially coupled with the first gear. The first gear is configured to join the second gear in a rotating process in a first direction to drive the second gear to rotate in the first direction. The first gear is disconnected with the second gear in a rotating process in a direction opposite to the first direction. The second one-way transmission assembly comprises a third gear and a fourth gear coaxially coupled with the third gear. The third gear is configured to join the fourth gear in a rotating process in a second direction to drive the second gear to rotate in the second direction. The third gear is disconnected with the fourth gear in a rotating process in a direction opposite to the second direction. The first gear and the third gear are engaged with the driving gear, and the second gear is engaged with the fourth gear. When the driving gear is rotating forward, the first gear is configured to receive a driving force of the driving gear to rotate in the first direction and drives the second gear to rotate in the first direction, the fourth gear is configured to receive a driving force of the second gear to rotate in the second direction and the third gear is configured to receive the driving force of the driving gear to rotate in the direction opposite to the second direction. When the driving gear is rotating backward, the third gear is configured to receive the driving force of the driving gear to rotate in the second direction and drives the fourth gear to rotate in the second direction, the second gear is configured to receive a driving force of the fourth gear to rotate in the first direction, and the first gear is configured to receive the driving force of the driving gear to rotate in the direction opposite to the first direction.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 2:
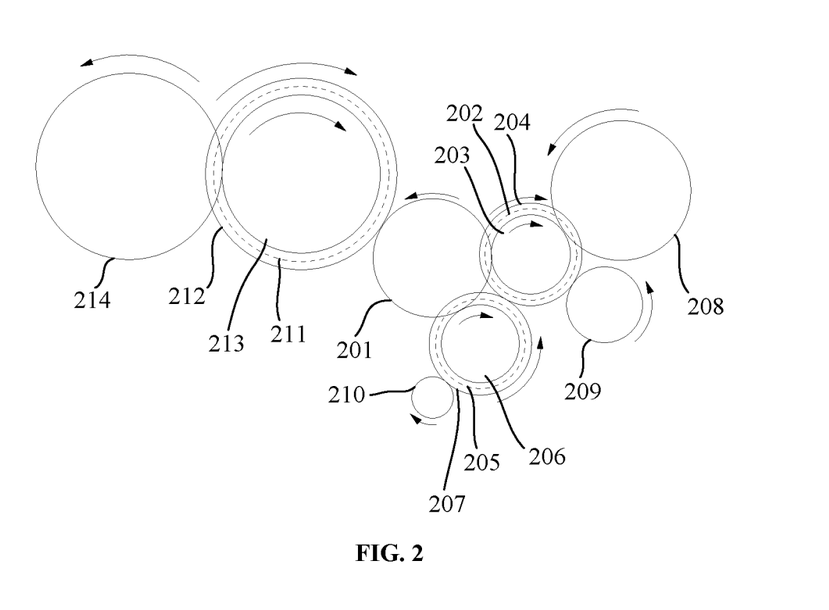
FIG. 2 is a schematic diagram of a driving system when a driving gear rotates forward according to some embodiments of the present disclosure.
Figure 3:
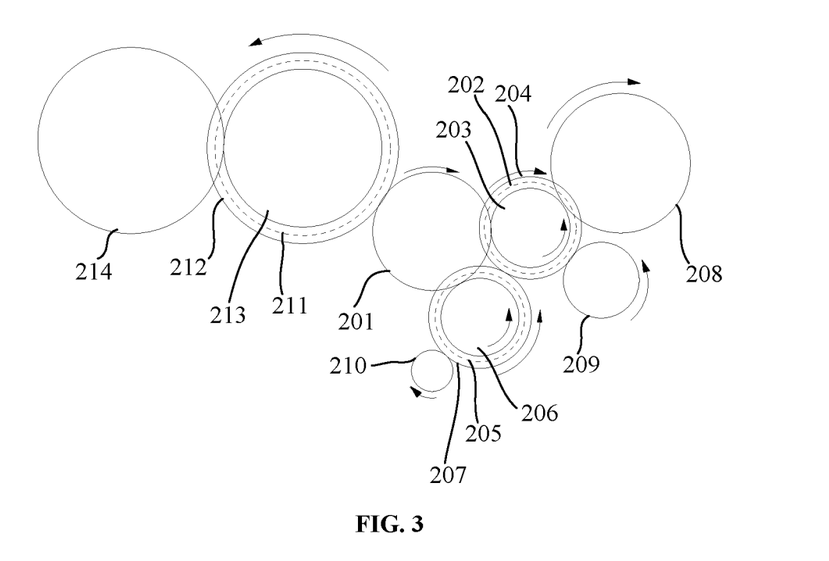
FIG. 3 is a schematic diagram of a driving system when a driving gear rotates backward according to some embodiments of the present disclosure.

Referring to FIGS. 2-3 an embodiment of the present invention provides a drive system. The driving system includes a driving gear 201, a first one-way transmission assembly 202, and a second one-way transmission assembly 205. The driving gear may rotate in a forward direction or in a backward direction. The first one-way transmission assembly 202 includes a first gear 203 and a second gear 204. The first gear 203 and the second gear 204 are coaxially coupled to each other. The first gear 203 is configured to join the second gear 204 in the rotating process in a first direction to drive the second gear 204 to rotate in the same direction. The first gear 203 is disconnected with the second gear 204 in the rotating process in a direction opposite to the first direction. The second one-way transmission assembly 205 includes a third gear 206 and a fourth gear 207. The third gear 206 and the fourth gear 207 are coaxially coupled to each other. The third gear 206 is configured to join the fourth gear 207 in the rotating process in a second direction to drive the fourth gear 207 to rotate in the same direction. The third gear 206 is disconnected with the fourth gear 207 in the rotating process in a direction opposite to the second direction. The first gear 203 and the third gear 206 are engaged with the driving gear 201. The second gear 204 is engaged with the fourth gear 207. When the driving gear 201 is rotating forward, the first gear 203 is used for receiving the driving force of the driving gear 201 to rotate in the first direction and drives the second gear 204 to rotate in the same direction. The fourth gear 207 is used for receiving the driving force of the second gear 204 to rotate in the second direction. The third gear is used for receiving the driving force of the driving gear 201 to rotate in a direction opposite to the second direction. When the driving gear 201 is rotating backward, the third gear 206 is used for receiving the driving force of the driving gear 201 to rotate in the second direction and drives the fourth gear 207 to rotate in the same direction. The second gear 204 is used for receiving the driving force of the fourth gear 207 to rotate in the first direction. The first gear 203 is used for receiving the driving force of the driving gear 201 to rotate in a direction opposite to the first direction.

In one embodiment, the driving system may be arranged in an image forming apparatus. The first gear 203 is engaged with the driving part 208 of the paper discharge unit, the second gear 204 is engaged with the driving part 209 of the fixing unit, and the fourth gear 207 is engaged with the driving part 210 of the double-sided printing unit. Therefore, when printing on the front side of the paper, the driving gear 201 may rotate forward as illustrated in FIG. 2. The driving gear 201 drives the first gear 203 to rotate in the first direction. The first gear 203 and the second gear 204 are connected, so that the first gear 203 drives the second gear 204 to rotate in the same direction. The first gear 203 also drives the driving part 208 of the paper discharge unit to rotate forward. The second gear 204 drives the driving part 209 of the fixing unit to rotate forward. At the same time, the driving gear 201 drives the third gear 206 to rotate in a direction opposite to the second direction, so that the third gear 206 and the fourth gear 207 are disconnected with each other. In other words, the third gear 206 cannot drive the fourth gear 207 to rotate in the same direction. The fourth gear 207 is driven by the second gear 204 to rotate in the second direction, so that the fourth gear 207 may drive the driving part 210 of the double-sided printing unit to rotate forward. The paper may pass through the paper pickup unit 104, the developing unit 105, the fixing unit 106, and the paper discharging unit 107 in sequence to complete the front-side printing. When the back side of the paper needs to be printed, the driving gear 201 may rotate backward as illustrated in FIG. 3. The driving gear 201 drives the third gear 206 to rotate in the second direction. The third gear 206 is configured to join the fourth gear 207, so that the third gear 206 drives the fourth gear 207 to rotate in the same direction. The fourth gear 207 may still drive the driving part 210 of the double-sided printing unit to rotate forward. At the same time, the driving gear 201 drives the first gear 203 to rotate in a direction opposite to the first direction. The first gear 203 and the second gear 204 are disconnected with each other. In other words, the first gear 203 cannot drive the second gear 204 to rotate in the same direction. The second gear 204 is driven by the fourth gear 207 to rotate in the first direction, so that the second gear 204 may still drive the driving part 209 of fixing unit to rotate forward. The first gear 203 may drive the driving part 208 of the paper discharge unit to rotate backward. The paper discharging unit 107 may convey the paper, which has been printed on the front side, to the double-sided printing unit 108. The two-sided printing unit 108 is used for overturning the paper and then conveying the paper to the developing unit 105. The paper may finish printing on the back side after passing through the developing unit 105, the fixing unit 106 and the paper discharging unit 107. Therefore, the image forming apparatus may achieve the double-sided printing function with only one motor. The structure of the image forming apparatus is simplified, and the cost of the image forming apparatus is reduced. According to the driving system provided by one embodiment of the disclosure, under the condition that the rotating driving force in forward direction or backward direction is received by the motor, the first gear 203 and the third gear 206 in the driving system may rotate forward or backward according to the rotating direction of the motor. The second gear 204 and the fourth gear 207 may rotate in the same direction regardless of the rotating direction of the driving motor. In other words, the second gear 204 and the fourth gear 207 may output a force in a fixed direction all the time, so that users may design the target to be driven by themselves according to the needs when designing the driver of the printer. For example, the second gear 204 may be engaged with the driving part 210 of double-sided printing unit driving part 210, and the fourth gear 207 is engaged with the driving part 209 of the fixing unit. The first gear 203, the second gear 204, and the fourth gear 207 may also be respectively engaged with the driving parts of other apparatuses, so that the effect that one motor may drive some apparatuses to rotate in one direction and may drive other apparatuses to rotate in two directions is achieved.

The first one-way transmission assembly 202 and the second one-way transmission assembly 205 may adopt a wend-type one-way clutch or a roller-type one-way clutch. An electric lock may also be used to realize the connecting or disconnecting of the first gear 203 and the second gear 204, and the connecting or disconnecting of the third gear 206 and the fourth gear 207. The driving gear 201 may be an output end of the motor, and may also be engaged with the output end of the motor through a transmission gear. The first gear 203 and the third gear 206 may be directly engaged with the driving gear 201, and may also be engaged with the driving gear 201 through a transmission gear, so that the requirements of turning and space of the first gear 203 and the third gear 206 are met. The second gear 204 and the fourth gear 207 may be directly engaged, and may also be engaged through a transmission gear, so that the requirements of turning and space of the second gear 204 and the fourth gear 207 are met. In addition, the first direction and the second direction mentioned may be in same directions or in opposite directions.

In one embodiment, the first gear is engaged with the driving part 208 of the paper discharge unit to drive the driving part 208 of the paper discharging unit to rotate. The second gear 204 is engaged with the driving part 209 of the fixing unit to drive the driving part 209 of the fixing unit to rotate. The fourth gear 207 is engaged with the driving part 210 of the double-sided printing unit to drive the driving part 210 of the double-sided printing unit to rotate. Therefore, when the front side of the paper needs to be printed, the driving gear 201 may rotate forward, and the driving gear 201 drives the first gear 203 to rotate in the first direction. The first gear 203 and the second gear 204 are connected. Thus, the first gear 203 drives the second gear 204 to rotate in the same direction. The first gear 203 may drive the driving part 208 of the paper discharge unit to rotate forward, and the second gear 204 may drive the driving part 209 of the fixing unit to rotate forward. At the same time, the driving gear 201 drives the third gear 206 to rotate in a direction opposite to the second direction. Then the third gear 206 and the fourth gear 207 are disconnected with each other. In other words, the third gear 206 cannot drive the fourth gear 207 to rotate in the same direction, and the fourth gear 207 is driven by the second gear 204 to rotate in the second direction. The fourth gear 207 may drive the driving part 210 of the double-sided printing unit to rotate forward. The paper may pass through the paper pickup unit 104, the developing unit 105, the fixing unit 106, and the paper discharging unit 107 in sequence to complete the front-side printing. When printing on the back side of the paper, the driving gear 201 may rotate backward. The driving gear 201 drives the third gear 206 to rotate in the second direction. The third gear 206 is configured to join the fourth gear 207, so that the third gear 206 drives the fourth gear 207 to rotate in the same direction. The fourth gear 207 may still drive the driving part 210 of the double-sided printing unit to rotate forward. At the same time, the driving gear 201 drives the first gear 203 to rotate in a direction opposite to the first direction. The first gear 203 and the second gear 204 are disconnected with each other. In other words, the first gear 203 cannot drive the second gear 204 to rotate in the same direction. The second gear 204 is driven by the fourth gear 207 to rotate in the first direction, so that the second gear 204 may still drive the driving part 209 of fixing unit to rotate forward. The first gear 203 may drive the driving part 208 of the paper discharge unit to rotate backward. The paper discharging unit 107 may convey the paper, which has been printed on the front side, to the double-sided printing unit 108. The two-sided printing unit 108 is used for overturning the paper and then conveying the paper to the developing unit 105. The paper may finish printing on the back side after passing through the developing unit 105, the fixing unit 106, and the paper discharging unit 107. Therefore, the image forming apparatus may achieve the double-sided printing function with only one motor. The structure of the image forming apparatus is simplified, and the cost of the image forming apparatus is reduced.

Figure 4:
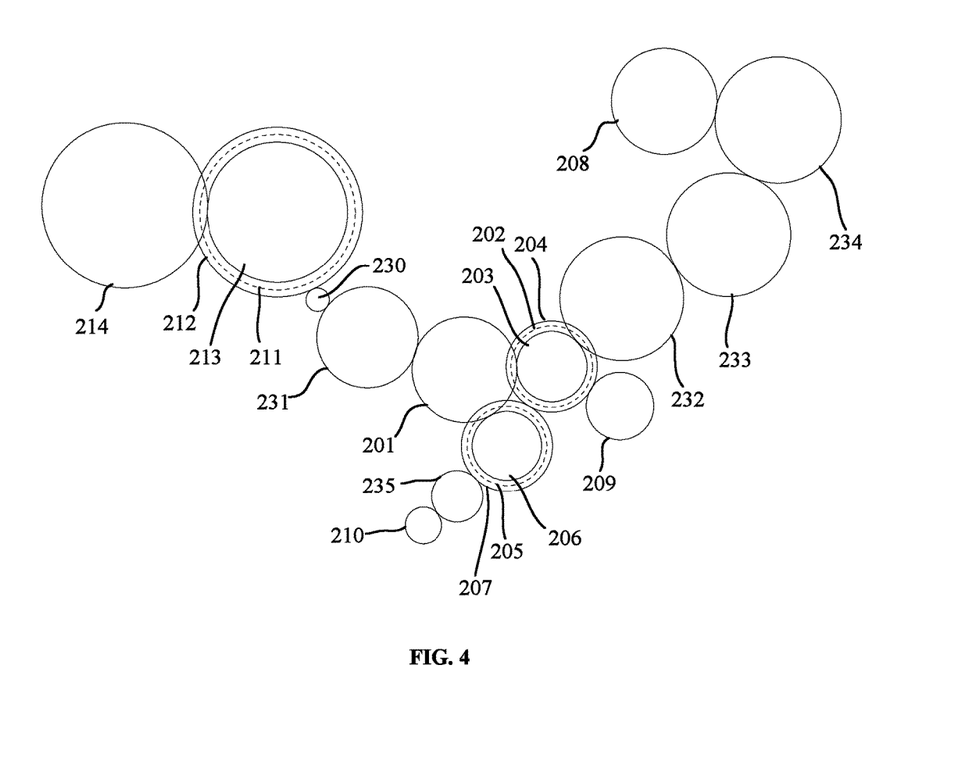
FIG. 4 is a schematic structural diagram of another driving system according to some embodiments of the present disclosure.

Referring to FIG. 4, for example, the output end 230 of the motor may be engaged with a first idler wheel 231. The first idler wheel 231 is engaged with the driving gear 201, so as to meet the space requirement between the motor and the first one-way transmission assembly 202, and between the motor and the second one-way transmission assembly 205. The first gear 203 may be engaged with a first transmission gear 232, and the first transmission gear 232 may be engaged with a second transmission gear 233. The second transmission gear 233 is engaged with a third transmission gear 234, and the third transmission gear 234 is engaged with the driving part 208 of the paper discharging unit 107 so as to meet the space requirement of the paper discharging unit 107. The fourth gear 207 may be engaged with a fourth transmission gear 235, and the fourth transmission gear 235 may be engaged with the driving part 210 of the double-sided printing unit 108 so as to meet the space requirement of the double-sided printing unit 108.

In one embodiment, the driving system further includes a third one-way transmission assembly 211. The third one-way transmission assembly 211 includes a fifth gear 212 and a sixth gear 213. The fifth gear 212 and the sixth gear 213 are coaxially coupled to each other. When the driving gear 201 rotates forward, the fifth gear 212 is used for receiving the driving force of the driving gear 201 to drive the sixth gear 213 to rotate in the same direction. When the driving gear 201 rotates backward, the fifth gear 212 cannot drive the sixth gear 213 to rotate. The sixth gear 213 is engaged with a driving part 214 of the photosensitive drum, and is used for driving the driving part 214 of the photosensitive drum to rotate. When the image forming apparatus starts up or starts imaging, the fixing unit 106 needs to be preheated. In the process of preheating the fixing unit 106, the driving gear 201 may be reversed as illustrated in FIG. 3. At this moment, the third gear 206 receives the driving force of the driving gear 201 to move in the second direction and drives the fourth gear 207 to rotate in the same direction. The second gear 204 receives the driving force of the fourth gear 207 and rotates in the first direction, so that the second gear 204 may drive the driving part 209 of the fixing unit to rotate and the fixing unit 106 is preheated. At the same time, the fifth gear 212 cannot drive the sixth gear 213 to rotate when the driving gear 201 is rotating backward. Thus, the sixth gear 213 does not drive the driving part 214 of the photosensitive drum to rotate, and the photosensitive drum does not work. Therefore, the fixing unit 106 and the photosensitive drum may be prevented from being simultaneously driven during the pre-heating process of the fixing unit 106. Otherwise, the photosensitive drum may consume the developer in the imaging box, which causes unnecessary waste. The photosensitive drum may also be prevented from discharging the developer into the image forming apparatus to pollute the image forming apparatus. In addition, during the pre-heating process of the fixing unit 106, the driving gear 201 drives the first gear 203 to rotate in a direction opposite to the first direction. The first gear 203 may drive the driving part 208 of the paper discharging unit to rotate backward. Then, the paper discharging unit 107 may convey the paper, which has been printed on the front side, to the double-sided printing unit 108. At the same time, the fourth gear 207 may drive the driving part 210 of the double-sided printing unit to rotate, so that the double-sided printing unit 108 may turn over the paper and then convey the paper to the developing unit 105. Thus, the double-sided printing unit 108 may also work in the process of preheating the fixing unit 106. When printing after the fixing unit 106 is pre-heated, the driving gear 201 may rotate forward as illustrated in FIG. 2. At this moment, when the driving gear 201 is rotating forward, the first gear 203 is used for receiving the driving force of the driving gear 201 to rotate in the first direction and drives the second gear 204 to rotate in the same direction. Thus, the second gear 204 may drive the driving part 209 of the fixing unit to rotate. At the same time, the fifth gear 212 may drive the sixth gear 213 to rotate in the same direction, so that the sixth gear 213 may drive the driving part 214 of the photosensitive drum to rotate and the photosensitive drum may start to work. Therefore the paper may pass through the paper pickup unit 104, the developing unit 105, the fixing unit 106, and the paper discharging unit 107 in sequence to complete the printing operation.

Figure 5:
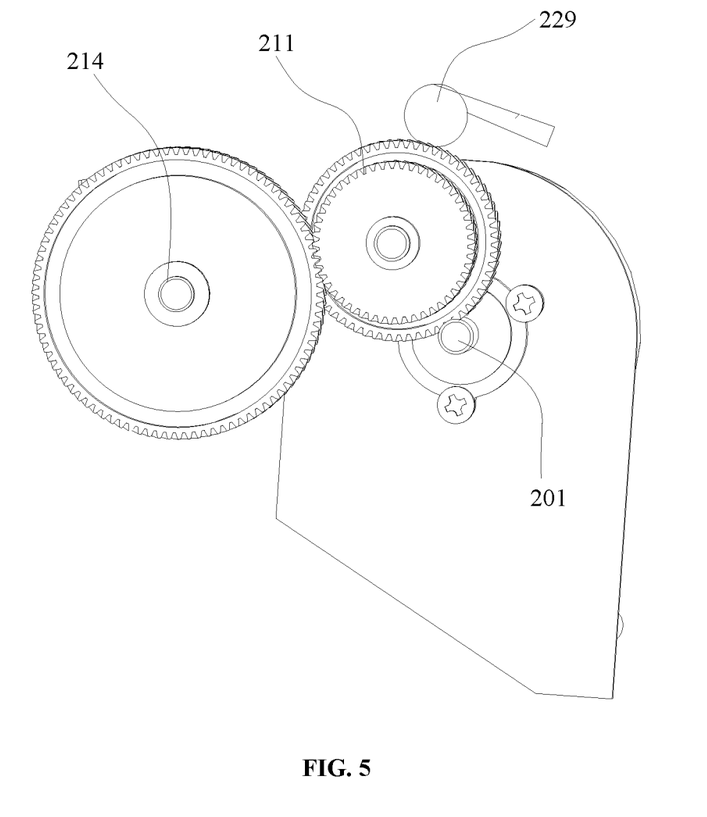
FIG. 5 is a schematic structural diagram of a third one-way transmission assembly according to some embodiments of the present disclosure.

The third one-way transmission assembly 211 may be a one-way clutch or a planetary gear. When the third one-way transmission assembly 211 is a one-way clutch, the fifth gear 212 may be configured to join the sixth gear 213 during the rotation process in the third direction to drive the sixth gear 213 to rotate in the same direction. The fifth gear 212 is disconnected with the sixth gear 213 during the rotation process in a direction opposite to the third direction. The fifth gear 212 is engaged with the driving gear 201. When the driving gear 201 rotates forward, the fifth gear 212 may be driven to rotate in the third direction. Thus, the fifth gear 212 is configured to join the sixth gear 213 to drive the sixth gear 213 to rotate in the same direction, so that the sixth gear 213 drives the driving part 214 of the photosensitive drum to rotate. When the driving gear 201 rotates backward, the fifth gear 212 may be driven to rotate in the direction opposite to the third direction. The fifth gear 212 is separated from the sixth gear 213, and the fifth gear 212 cannot drive the sixth gear 213 to rotate. Thus, the sixth gear 213 cannot drive the driving part 214 of the photosensitive drum to rotate. When the third one-way transmission assembly 211 is a planetary gear as illustrated in FIG. 5, when the driving gear 201 rotates forward, the driving device 229 may drive the fifth gear 212 to be engaged with the driving gear 201, so that the driving gear 201 may drive the fifth gear 212 to rotate. The fifth gear 212 drives the sixth gear 213 to rotate in the same direction, so that the sixth gear 213 drives the driving part 214 of the photosensitive drum to rotate. When the driving gear 201 rotates backward, the driving device 229 may drive the fifth gear 212 to be disconnected with the driving gear 201, so that the driving gear 201 cannot drive the fifth gear 212 to rotate. Thus, the sixth gear 213 cannot drive the driving part 214 of the photosensitive drum to rotate. In addition, the third direction, the first direction, and the second direction mentioned may be the same directions or be opposite directions according to various embodiments of the present disclosure.

Figure 6:
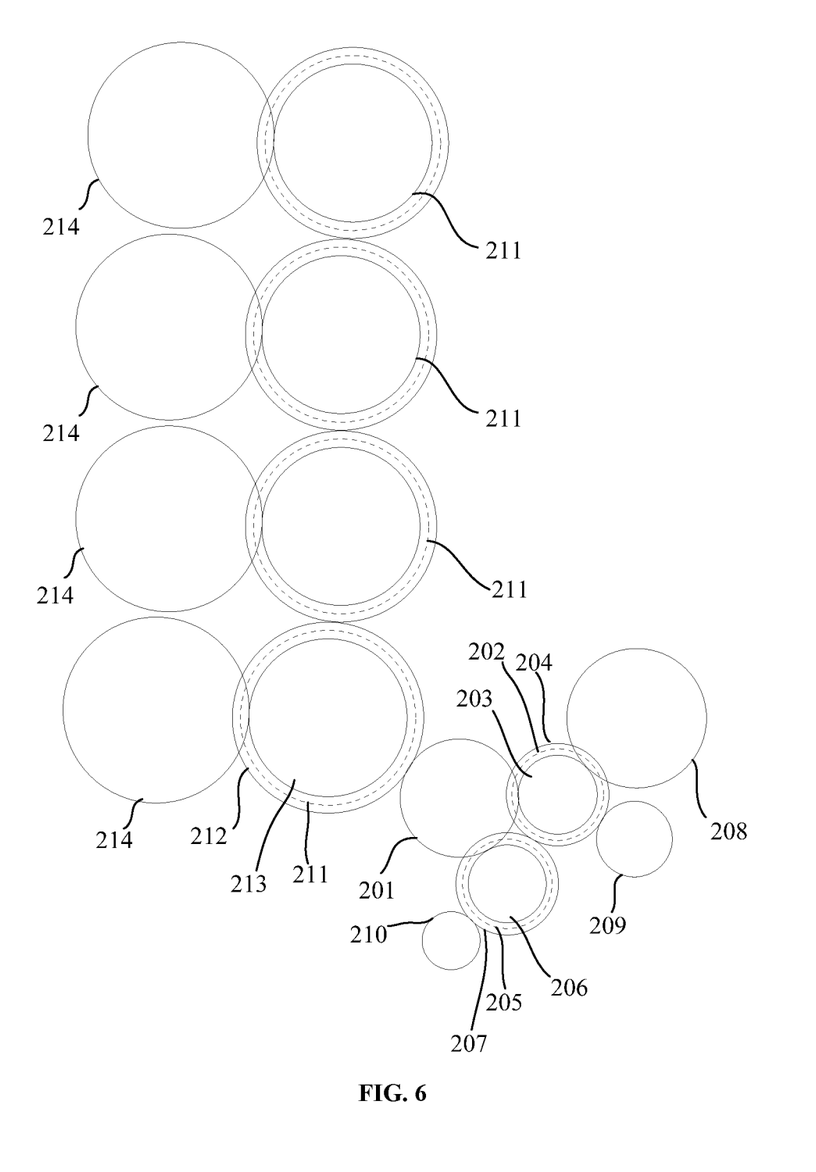
FIG. 6 is a schematic structural diagram of another driving system according to some embodiments of the present disclosure.

Referring to FIG. 6, in one embodiment, multiple third one-way transmission assemblies 211 may be provided. Therefore, multiple sixth gears 213 are also provided. The plurality of sixth gears 213 may be engaged in sequence, and one of the fifth gears 212 may be engaged with the driving gear 201. Thus, when the plurality of sixth gears 213 are engaged in sequence, and one of the fifth gears 212 is engaged with the driving gear 201. When the driving gear 201 rotates forward, the fifth gear 212, which is engaged with the driving gear 201, may be driven to rotate. The fifth gear 212 may drive the sixth gear 213, which is coaxial with the fifth gear 212, to rotate in the same direction, so that the sixth gear 213 may drive other sixth gears 213 to rotate. Thus, the plurality of the driving parts 214 of the photosensitive drums may be driven to rotate. Each photosensitive drum corresponds to a developer with a different color, so that the color printing is realized, and the internal space of the image forming apparatus is saved. Certainly, each of the plurality of fifth gears 212 may be directly engaged with the driving gear 201 or be engaged with the driving gear 201 through a transmission gear.

As disclosed, the driving system further includes a fourth one-way transmission assembly. The fourth one-way transmission assembly includes a seventh gear and an eighth gear, and the seventh gear and the eighth gear are coaxially coupled to each other. The seventh gear is used for receiving the driving force of the driving gear 201 when the driving gear 201 rotates backward to drive the eighth gear to rotate in the same direction. The eighth gear cannot be driven to rotate while the driving gear 201 rotates forward. The eighth gear is engaged with the driving part 214 of the photosensitive drum to drive the driving part 214 of the photosensitive drum to rotate. The driving part 214 of the photosensitive drum, which is engaged with the eighth gear, corresponds to a black developer. The plurality of driving parts 214 of the photosensitive drum, which engaged with the sixth gears 213 in the third one-way transmission assemblies 211, corresponds to color developers. Thus, color imaging may be carried out in the forward rotation process of the driving gear 201, and black imaging is carried out in the backward process of the driving gear 201.

In one embodiment, the first gear 203 is an inner gear, the second gear 204 is an outer gear, the third gear 206 is an inner gear, and the fourth gear 207 is an outer gear. The first gear 203 and the third gear 206 are engaged with the driving gear 201, respectively. The second gear 204 is engaged with the fourth gear 207. The position relationship between the inner gears and outer gears is that the projection of the outer gear in a plane perpendicular to the axial direction is located on the outer side of the projection of the inner gear on the same plane. In other words, the diameter of the inner gear is smaller than the diameter of the outer gear which is coaxial with the inner gear. Thus, the driving gear 201, the first one-way transmission assembly 202, and the second one-way transmission assembly 205 may be engaged without other transmission gears, so that space is saved, and the structure is simplified.

In one embodiment, the first one-way transmission assembly 202 further includes a first clutch system. The first clutch system is connected with the first gear 203 and the second gear 204. The first clutch system is configured to enable the first gear 203 to be configured to join the second gear 204 when the first gear 203 rotates in the first direction. The first gear 203 is disconnected with the second gear 204 when the first gear 203 rotates in a direction opposite to the first direction. The second one-way transmission assembly 205 further includes a second clutch system. The second clutch system is connected with the third gear 206 and the fourth gear 207. The second clutch system is configured to enable the third gear 206 to be configured to join the fourth gear 207 when the third gear 206 rotates in the second direction. The third gear 206 is disconnected with the fourth gear 207 when the third gear 206 rotates in a direction opposite to the second direction. Thus, by arranging the first clutch system and the second clutch system, the first one-way transmission assembly 202 and the second one-way transmission assembly 205 may be simple in structure and reliable in transmission. The first gear 203 and the second gear 204 may be connected or disconnected through the electric lock. The third gear 206 and the fourth gear 207 may also be connected or disconnected through the electric lock Referring to FIG. 7, in one embodiment, the first clutch system includes a first rotating shaft 215, a first elastic restoration device (not shown), a first protrusion part 216, and a second protrusion part 219. The first gear 203 and the second gear 204 are arranged on the first rotating shaft 215 in a sleeved mode. The first gear 203 and the second gear 204 may rotate relative to the first rotating shaft 215. The first surface of the first gear 203 faces the second gear 204. The first protrusion part 216 is arranged on the first surface of the first gear 203. The first protrusion part 216 protrudes from the first surface of the first gear 203 along the axial direction of the first gear 203. The first protrusion part 216 includes a first plane 217 and a second plane 218. The first plane 217 is perpendicular to the first surface of the first gear 203 and extends at least along the radial direction of the first gear 203. The first end of the second plane 218 is connected with the top of the first plane 217. The second end of the second plane 218 is connected with the first surface of the first gear 203. A set angle is formed between the second plane 218 and the first plane 217. The first surface of the second gear 204 faces the first gear 203. The second protrusion part 219 is arranged on the first surface of the second gear 204, and the second protrusion part 219 protrudes from the first surface of the second gear 204 along the axial direction of the second gear 204. The second protrusion part 219 includes a third plane 220 and a fourth plane 221. The third plane 220 is perpendicular to the first surface of the second gear 204 and extends at least along the radial direction of the second gear 204. The first end of the fourth plane 221 is connected with the top of the third plane 220. The second end of the fourth plane 221 is connected with the first surface of the second gear 204. A set angle is formed between the fourth plane 221 and the third plane 220. The first elastic restoration device is arranged between the first gear 203 and the second gear 204 to allow a set distance there-between, so that the first protrusion part 216 and the second protrusion part 219 may be in contact with each other. The first plane and the third plane are engaged when the first gear 203 rotates in the first direction, so that the first gear 203 may drive the second gear 204 to rotate in the same direction. The second plane 218 and the fourth plane 221 are configured to slide relatively when the first gear 203 rotates in the direction opposite to the first direction, so that the first gear 203 and the second gear 204 are disconnected with each other. Therefore, the first one-way transmission assembly 202 is simple in structure and reliable in transmission.

Figure 7:
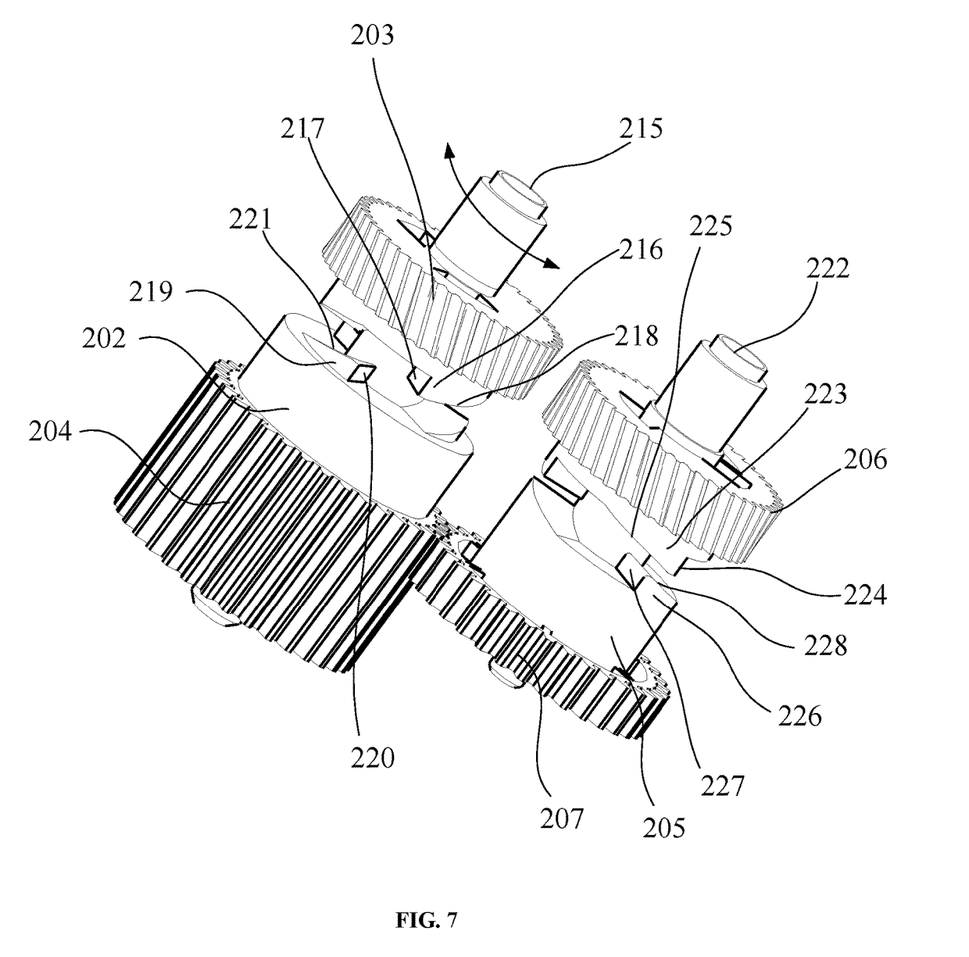
FIG. 7 is a schematic structural diagram of a first one-way transmission assembly and a second one-way transmission assembly according to some embodiments of the present disclosure.

In one embodiment, the second clutch system includes a second rotating shaft 222, a second elastic restoration device (not shown), a third protrusion part 223, and a fourth protrusion part 226. The third gear 206 and the fourth gear 207 are arranged on the second rotating shaft 222 in a sleeved mode, and they may rotate relative to the second rotating shaft 222. The first surface of the third gear 206 faces the fourth gear 207. The third protrusion part 223 is arranged on the first surface of the third gear 206, and the third protrusion part 223 protrudes from the first surface of the third gear 206 along the axial direction of the third gear 206. The third protrusion part 223 includes a fifth plane 224 and a sixth plane 225. The fifth plane 224 is perpendicular to the first surface of the third gear 206 and extends at least along the radial direction of the third gear 206. The first end of the sixth plane 225 is connected with the top of the fifth plane 224, and the second end of the sixth plane 225 is connected with the first surface of the third gear 206. A set angle is formed between the sixth plane 225 and the fifth plane 224. The first surface of the fourth gear 207 faces the third gear 206. The fourth protrusion part 226 is arranged on the first surface of the fourth gear 207, and the fourth protrusion part 226 protrudes from the first surface of the fourth gear 207 along the axial direction of the fourth gear 207. The fourth protrusion part 226 includes a seventh plane 227 and an eighth plane 228. The seventh plane 227 is perpendicular to the first surface of the fourth gear 207 and extends at least along the radial direction of the fourth gear 207. The first end of the eighth plane 228 is connected with the top of the seventh plane 227. The second end of the eighth plane 228 is connected with the first surface of the fourth gear 207. A set angle is formed between the eighth plane 228 and the seventh plane 227. The second elastic restoration device is arranged between the third gear 206 and the fourth gear 207 to allow a set distance there-between, so that the third protrusion part 223 and the fourth protrusion part 226 may be in contact with each other. The fifth plane 224 and the seventh plane 227 are engaged when the third gear 206 rotates in the second direction, so that the third gear 206 may drive the fourth gear 207 to rotate in the same direction. The sixth plane 225 and the eighth plane 228 are configured to slide relatively when the third gear 206 rotates in the direction opposite to the second direction, so that the third gear 206 is disconnected with the fourth gear 207. Therefore, the second one-way transmission assembly 205 is simple in structure and reliable in transmission.

In one embodiment, the first clutch system and/or the second clutch system are/is a needle roller clutch system. Therefore, the first one-way transmission assembly 202 and/or the second one-way transmission assembly 205 are/is simple in structure and reliable in transmission.

In addition, the third one-way transmission assembly 211 may adopt a similar structure as the first one-way transmission assembly 202 and the second one-way transmission assembly 205 discussed above.

The embodiment of the invention provides an image forming apparatus, which includes a driving system and a motor according to any embodiment of the disclosure. The motor is engaged with the driving gear and is used for driving the driving gear to rotate.

In one embodiment, the first gear 203 may be engaged with the paper discharge unit drive 208. The second gear is engaged with the driving part 209 of the fixing unit, and the fourth gear is engaged with the driving part 210 of the double-sided printing unit. Therefore, when the front side of the paper needs to be printed, the driving gear 201 may be driven by the motor to rotate forward. The driving gear 201 drives the first gear 203 to rotate in the first direction. Thus, the first gear 203 and the second gear 204 are connected, so that the first gear 203 drives the second gear 204 to rotate in the same direction. The first gear 203 may also drive the driving part 208 of the paper discharge unit to rotate forward, and the second gear 204 may drive the driving part 209 of the fixing unit to rotate forward. At the same time, the driving gear 201 drives the third gear 206 to rotate in a direction opposite to the second direction. Then, the third gear 206 and the fourth gear 207 are disconnected with each other. In other words, the third gear 206 cannot drive the fourth gear 207 to rotate in the same direction. The fourth gear 207 is driven by the second gear 204 to rotate in the second direction, so that the fourth gear 207 may drive the driving part 210 of the double-sided printing unit to rotate forward. Then, the paper may pass through the paper pickup unit 104, the developing unit 105, the fixing unit 106, and the paper discharging unit 107 in sequence to complete the front-side printing. When the back side of the paper needs to be printed, the driving gear 201 may be driven by the motor to rotate backward. The driving gear 201 drives the third gear 206 to rotate in the second direction. Then, the third gear 206 is connected with the fourth gear 207, so that the third gear 206 drives the fourth gear 207 to rotate in the same direction. The fourth gear 207 may still drive the driving part 210 of the double-sided printing unit to rotate forward. At the same time, the driving gear 201 drives the first gear 203 to rotate in a direction opposite to the first direction. Then the first gear 203 and the second gear 204 are disconnected with each other. In other words, the first gear 203 cannot drive the second gear 204 to rotate in the same direction. The second gear 204 is driven by the fourth gear 207 to rotate in the first direction, so that the second gear 204 may still drive the driving part 209 of the fixing unit to rotate forward. The first gear 203 may drive the driving part 208 of the paper discharge unit to rotate backward. At this moment, the paper discharging unit 107 may convey the front paper to the double-sided printing unit 108, and the two-sided printing unit 108 is used for overturning the paper and then transferring the paper to the developing unit 105. The paper is subjected to be printed on the back side after passing through the developing unit 105, the fixing unit 106, and the paper discharging unit 107. Therefore, the image forming apparatus may achieve the double-sided printing function with only one motor. The structure of the image forming apparatus is simplified, and the cost of the image forming apparatus is reduced. According to the driving system provided by one embodiment of the disclosure, under the condition that the rotating driving force in forward direction or backward direction is received by the motor, the first gear 203 and the third gear 206 in the driving system may rotate forward or backward according to the rotating direction of the motor. The second gear 204 and the fourth gear 207 may rotate in the same direction regardless of the rotating direction of the driving motor. In other words, the second gear 204 and the fourth gear 207 may output a force in a fixed direction all the time, so that users may design the target to be driven by themselves according to the needs when designing the driver of the printer. For example, the second gear 204 may be engaged with the driving part 210 of double-sided printing unit driving part 210, and the fourth gear 207 is engaged with the driving part 209 of the fixing unit. The first gear 203, the second gear 204, and the fourth gear 207 may also be respectively engaged with the driving parts of other apparatuses, so that the effect that one motor may drive some apparatuses to rotate in one direction and may drive other apparatuses to rotate in two directions is achieved.

In one embodiment, the image forming apparatus further includes a paper discharge unit 107, a fixing unit 106, and a double-sided printing unit 108. The paper discharge unit 107 is engaged with the driving part 208 of the paper discharge unit. The fixing unit 106 is engaged with the driving part 209 of the fixing unit. The double-sided printing unit 108 is engaged with the driving part 210 of the double-sided printing unit. The first gear 203 may drive the driving part 208 of the paper discharge unit to rotate in two directions, so that the paper discharge unit 107 may be rotated in a bidirectional manner to discharge the paper from the first path 101 or to convey the paper to the second path 102. The second gear 204 and the fourth gear 207 may always drive the driving part 209 of the fixing unit and the driving part 210 of the double-sided printing unit to rotate in one direction. Thus, the fixing unit 106 and the double-sided printing unit 108 are always rotating in one direction so as to complete printing work. Therefore, the image forming apparatus may achieve the double-sided printing function only by having one motor. The structure of the image forming apparatus is simplified, and the cost of the image forming apparatus is reduced.

Finally, it should be noted that the above embodiments are only used to illustrate the technical solutions of the present invention and are not limited thereto. Although the present invention has been described in detail with reference to the above embodiments, it should be understood by those of ordinary skill in the art that the technical scheme described in the embodiments may still be modified, some or all of the technical features may be equivalently replaced, and the modification or replacement does not make the essence of the corresponding technical solution deviate from the scope of the technical solutions of the embodiments of the present invention.

What is claimed is:

1. A driving system, comprising:
   a driving gear configured to rotate forward or backward;
   a first one-way transmission assembly, comprising a first gear and a second gear coaxially coupled with the first gear, wherein
      the first gear is configured to join the second gear in a rotating process in a first direction to drive the second gear to rotate in the first direction, and
      the first gear is disconnected with the second gear in a rotating process in a direction opposite to the first direction; and a second one-way transmission assembly, comprising a third gear and a fourth gear coaxially coupled with the third gear, wherein
   the third gear is configured to join the fourth gear in a rotating process in a second direction to drive the second gear to rotate in the second direction, and
   the third gear is disconnected with the fourth gear in a rotating process in a direction opposite to the second direction,
wherein
the first gear and the third gear are engaged with the driving gear, and the second gear is engaged with the fourth gear,
when the driving gear is rotating forward,
   the first gear is configured to receive a driving force of the driving gear to rotate in the first direction and drives the second gear to rotate in the first direction,
   the fourth gear is configured to receive a driving force of the second gear to rotate in the second direction, and
   the third gear is configured to receive the driving force of the driving gear to rotate in the direction opposite to the second direction, and
when the driving gear is rotating backward,
   the third gear is configured to receive the driving force of the driving gear to rotate in the second direction and drives the fourth gear to rotate in the second direction,
   the second gear is configured to receive a driving force of the fourth gear to rotate in the first direction, and
   the first gear is configured to receive the driving force of the driving gear to rotate in the direction opposite to the first direction.

2. The driving system according to claim 1, wherein
the first gear is engaged with a driving part of a paper discharge unit to drive the driving part of the paper discharge unit to rotate,
the second gear is engaged with a driving part of a fixing unit to drive the driving part of the fixing unit to rotate, and
the fourth gear is engaged with a driving part of a double-sided printing unit to drive the driving part of the double-sided printing unit to rotate.

3. The driving system according to claim 2, further comprising a third one-way transmission assembly, the third one-way transmission assembly comprising a fifth gear and a sixth gear coaxially coupled with the fifth gear, wherein
   when the driving gear rotates forward, the fifth gear is configured to receive the driving force of the driving gear to drive the sixth gear to rotate in a same direction,
   when the driving gear rotates backward, the fifth gear is unable to drive the sixth gear to rotate, and
   the sixth gear is engaged with a driving part of a photosensitive drum to drive the driving part of the photosensitive drum to rotate.

4. The driving system according to claim 3, comprising a plurality of the third one-way transmission assemblies, wherein
   a plurality of the sixth gears is engaged in sequence, and one of a plurality of the fifth gears is engaged with the driving gear.

5. The driving system according to claim 1, wherein
the first gear is a first inner gear,
the second gear is a first outer gear,
the third gear is a second inner gear,
the fourth gear is a second outer gear,
the first gear and the third gear are engaged with the driving gear, respectively, and
the second gear is engaged with the fourth gear.

6. The driving system according to claim 1, wherein
the first one-way transmission assembly further comprises a first clutch system, the first clutch system being connected with the first gear and the second gear, wherein
   the first clutch system is configured to enable the first gear to be connected with the second gear when the first gear rotates in the first direction, and
   the first gear is disconnected with the second gear when the first gear rotates in the direction opposite to the first direction, and
the second one-way transmission assembly further comprises a second clutch system, the second clutch system being connected with the third gear and the fourth gear, wherein
   the second clutch system is configured to enable the third gear to be connected with the fourth gear when the third gear rotates in the second direction, and
   the third gear is disconnected with the fourth gear when the third gear rotates in the direction opposite to the second direction.

7. The driving system according to claim 6, wherein the first clutch system comprises:
a first rotating shaft;
a first elastic restoration device;
a first protrusion part; and
a second protrusion part,
wherein
   the first gear and the second gear are arranged on the first rotating shaft in a sleeved mode,
   the first gear and the second gear each rotates relatively to the first rotating shaft,
wherein
   a first surface of the first gear faces the second gear,
   the first protrusion part is arranged on the first surface of the first gear, and the first protrusion part protrudes from the first surface of the first gear along an axial direction of the first gear,
   the first protrusion part comprises a first plane and a second plane, the first plane being perpendicular to the first surface of the first gear and extending at least along a radial direction of the first gear,
   a first end of the second plane is connected with a top of the first plane, and a second end of the second plane is connected with the first surface of the first gear, and
   a first set angle is formed between the second plane and the first plane,
wherein
   a first surface of the second gear faces the first gear,
   the second protrusion part is arranged on the first surface of the second gear, and the second protrusion part protrudes from the first surface of the second gear along an axial direction of the second gear,
   the second protrusion part comprises a third plane and a fourth plane, the third plane being perpendicular to the first surface of the second gear and extending at least along a radial direction of the second gear,
   a first end of the fourth plane is connected with a top of the third plane, and a second end of the fourth plane is connected with the first surface of the second gear, and
   a second set angle is formed between the fourth plane and the third plane, and wherein
the first elastic restoration device is arranged between the first gear and the second gear to allow a set distance there-between, so that the first protrusion part and the second protrusion part are in contact with each other,
the first plane and the third plane are engaged when the first gear rotates in the first direction, so that the first gear drives the second gear to rotate in the same direction, and
the second plane and the fourth plane are configured to slide relatively with each other when the first gear rotates in the direction opposite to the first direction, so that the first gear and the second gear are disconnected with each other.

8. The driving system according to claim 6, wherein the second clutch system comprises:
a second rotating shaft;
a second elastic restoration device;
a third protrusion part; and
a fourth protrusion part,
wherein
a third gear and the fourth gear are arranged on the second rotating shaft in a sleeved mode, and
the third gear and the fourth gear rotate relative to the second rotating shaft,
wherein
the first surface of the third gear faces the fourth gear,
the third protrusion part is arranged on the first surface of the third gear, and the third protrusion part protrudes from the first surface of the third gear along an axial direction of the third gear,
the third protrusion part comprises a fifth plane and a sixth plane, the fifth plane being perpendicular to the first surface of the third gear and extending at least along a radial direction of the third gear,
a first end of the sixth plane is connected with a top of the fifth plane, and a second end of the sixth plane is connected with the first surface of the third gear, and
a first set angle is formed between the sixth plane and the fifth plane,
wherein
a first surface of the fourth gear faces the third gear,
the fourth protrusion part is arranged on the first surface of the fourth gear, and the fourth protrusion part protrudes from the first surface of the fourth gear along an axial direction of the fourth gear,
the fourth protrusion part comprises a seventh plane and an eighth plane, the seventh plane being perpendicular to the first surface of the fourth gear and extending at least along a radial direction of the fourth gear,
a first end of the eighth plane is connected with the top of the seventh plane, a second end of the eighth plane is connected with the first surface of the fourth gear, and
a second set angle is formed between the eighth plane and the seventh plane, and
wherein
the second elastic restoration device is arranged between the third gear and the fourth gear to allow a set distance there-between, so that the third protrusion part and the fourth protrusion part are in contact with each other, the fifth plane and the seventh plane are engaged when the third gear rotates in the second direction, so that the third gear drives the fourth gear to rotate in the same direction, and
the sixth plane and the eighth plane are configured to slide relatively with each other when the third gear rotates in the direction opposite to the second direction, so that the third gear is disconnected with the fourth gear.

9. The driving system according to claim 6, wherein one or more of the first clutch system and the second clutch system include a needle roller clutch system.

10. An image forming apparatus, comprising:
a driving system comprising:
a driving gear configured to rotate forward or backward;
a first one-way transmission assembly, comprising a first gear and a second gear coaxially coupled with the first gear, wherein
the first gear is configured to join the second gear in a rotating process in a first direction to drive the second gear to rotate in the first direction, and
the first gear is disconnected with the second gear in a rotating process in a direction opposite to the first direction; and
a second one-way transmission assembly, comprising a third gear and a fourth gear coaxially coupled with the third gear, wherein
the third gear is configured to join the fourth gear in a rotating process in a second direction to drive the second gear to rotate in the second direction, and
the third gear is disconnected with the fourth gear in a rotating process in a direction opposite to the second direction,
wherein
the first gear and the third gear are engaged with the driving gear, and the second gear is engaged with the fourth gear,
when the driving gear is rotating forward,
the first gear is configured to receive a driving force of the driving gear to rotate in the first direction and drives the second gear to rotate in the first direction,
the fourth gear is configured to receive a driving force of the second gear to rotate in the second direction, and
the third gear is configured to receive the driving force of the driving gear to rotate in the direction opposite to the second direction, and
when the driving gear is rotating backward,
the third gear is configured to receive the driving force of the driving gear to rotate in the second direction and drives the fourth gear to rotate in the second direction,
the second gear is configured to receive a driving force of the fourth gear to rotate in the first direction, and
the first gear is configured to receive the driving force of the driving gear to rotate in the direction opposite to the first direction.

11. The image forming apparatus according to claim 10, wherein
the first gear is engaged with a driving part of a paper discharge unit to drive the driving part of the paper discharge unit to rotate,
the second gear is engaged with a driving part of a fixing unit to drive the driving part of the fixing unit to rotate, and the fourth gear is engaged with a driving part of a double-sided printing unit to drive the driving part of the double-sided printing unit to rotate.

12. The image forming apparatus according to claim 11, further comprising a third one-way transmission assembly, the third one-way transmission assembly comprising a fifth gear and a sixth gear coaxially coupled with the fifth gear, wherein
when the driving gear rotates forward, the fifth gear is configured to receive the driving force of the driving gear to drive the sixth gear to rotate in a same direction,
when the driving gear rotates backward, the fifth gear is unable to drive the sixth gear to rotate, and
the sixth gear is engaged with a driving part of a photosensitive drum to drive the driving part of the photosensitive drum to rotate.

13. The image forming apparatus according to claim 12, comprising a plurality of the third one-way transmission assemblies, wherein
a plurality of the sixth gears is engaged in sequence, and
one of a plurality of the fifth gears is engaged with the driving gear.

14. The image forming apparatus according to claim 10, wherein
the first gear is a first inner gear,
the second gear is a first outer gear,
the third gear is a second inner gear,
the fourth gear is a second outer gear,
the first gear and the third gear are engaged with the driving gear, respectively, and
the second gear is engaged with the fourth gear.

15. The image forming apparatus according to claim 10, wherein
the first one-way transmission assembly further comprises a first clutch system, the first clutch system being connected with the first gear and the second gear, wherein
the first clutch system is configured to enable the first gear to be connected with the second gear when the first gear rotates in the first direction, and
the first gear is disconnected with the second gear when the first gear rotates in the direction opposite to the first direction, and
the second one-way transmission assembly further comprises a second clutch system, the second clutch system being connected with the third gear and the fourth gear, wherein
the second clutch system is configured to enable the third gear to be connected with the fourth gear when the third gear rotates in the second direction, and
the third gear is disconnected with the fourth gear when the third gear rotates in the direction opposite to the second direction.

16. The image forming apparatus according to claim 15, wherein the first clutch system comprises:
a first rotating shaft;
a first elastic restoration device;
a first protrusion part; and
a second protrusion part,
wherein
the first gear and the second gear are arranged on the first rotating shaft in a sleeved mode,
the first gear and the second gear each rotates relatively to the first rotating shaft,
wherein
a first surface of the first gear faces the second gear,
the first protrusion part is arranged on the first surface of the first gear, and the first protrusion part protrudes from the first surface of the first gear along an axial direction of the first gear,
the first protrusion part comprises a first plane and a second plane, the first plane being perpendicular to the first surface of the first gear and extending at least along a radial direction of the first gear,
a first end of the second plane is connected with a top of the first plane, and a second end of the second plane is connected with the first surface of the first gear, and
a first set angle is formed between the second plane and the first plane,
wherein
a first surface of the second gear faces the first gear,
the second protrusion part is arranged on the first surface of the second gear, and the second protrusion part protrudes from the first surface of the second gear along an axial direction of the second gear,
the second protrusion part comprises a third plane and a fourth plane, the third plane being perpendicular to the first surface of the second gear and extending at least along a radial direction of the second gear,
a first end of the fourth plane is connected with a top of the third plane, and a second end of the fourth plane is connected with the first surface of the second gear, and
a second set angle is formed between the fourth plane and the third plane, and
wherein
the first elastic restoration device is arranged between the first gear and the second gear to allow a set distance there-between, so that the first protrusion part and the second protrusion part are in contact with each other,
the first plane and the third plane are engaged when the first gear rotates in the first direction, so that the first gear drives the second gear to rotate in the same direction, and
the second plane and the fourth plane are configured to slide relatively with each other when the first gear rotates in the direction opposite to the first direction, so that the first gear and the second gear are disconnected with each other.

17. The image forming apparatus according to claim 15, wherein the second clutch system comprises:
a second rotating shaft;
a second elastic restoration device;
a third protrusion part; and
a fourth protrusion part,
wherein
a third gear and the fourth gear are arranged on the second rotating shaft in a sleeved mode, and
the third gear and the fourth gear rotate relative to the second rotating shaft,
wherein
the first surface of the third gear faces the fourth gear,
the third protrusion part is arranged on the first surface of the third gear, and the third protrusion part protrudes from the first surface of the third gear along an axial direction of the third gear,
the third protrusion part comprises a fifth plane and a sixth plane, the fifth plane being perpendicular to the first surface of the third gear and extending at least along a radial direction of the third gear, a first end of the sixth plane is connected with a top of the fifth plane, and a second end of the sixth plane is connected with the first surface of the third gear, and a first set angle is formed between the sixth plane and the fifth plane, wherein a first surface of the fourth gear faces the third gear, the fourth protrusion part is arranged on the first surface of the fourth gear, and the fourth protrusion part protrudes from the first surface of the fourth gear along an axial direction of the fourth gear, the fourth protrusion part comprises a seventh plane and an eighth plane, the seventh plane being perpendicular to the first surface of the fourth gear and extending at least along a radial direction of the fourth gear, a first end of the eighth plane is connected with the top of the seventh plane, a second end of the eighth plane is connected with the first surface of the fourth gear, and a second set angle is formed between the eighth plane and the seventh plane, and wherein the second elastic restoration device is arranged between the third gear and the fourth gear to allow a set distance there-between, so that the third protrusion part and the fourth protrusion part are in contact with each other, the fifth plane and the seventh plane are engaged when the third gear rotates in the second direction, so that the third gear drives the fourth gear to rotate in the same direction, and the sixth plane and the eighth plane are configured to slide relatively with each other when the third gear rotates in the direction opposite to the second direction, so that the third gear is disconnected with the fourth gear.

18. The image forming apparatus according to claim 15, wherein one or more of the first clutch system and the second clutch system include a needle roller clutch system.

19. The image forming apparatus according to claim 10, further comprising:

the paper discharge unit engaged with the driving part of the paper discharge unit;

the fixing unit engaged with the driving part of the fixing unit; and the double-sided printing unit engaged with the driving part of the double-sided printing unit.

20. The image forming apparatus according to claim 10, wherein the first gear drives the driving part of the paper discharge unit to rotate in two directions, so that the paper discharge unit rotates in a bidirectional manner to discharge the paper from a first path or to convey the paper to a second path, the second gear and the fourth gear drive the driving part of the fixing unit and the driving part of the double-sided printing unit to rotate in a same direction, so that the fixing unit and the double-sided printing unit rotates in the same direction to complete printing work.

\* \* \* \* \*